United States Patent
Ademoye et al.

(10) Patent No.: US 11,368,119 B2
(45) Date of Patent: Jun. 21, 2022

(54) MOTOR CURRENT BALANCING METHOD FOR ESP SYSTEM

(71) Applicant: Baker Hughes Oilfield Operations LLC, Houston, TX (US)

(72) Inventors: Taoridi A. Ademoye, Tulsa, OK (US); Michael C. Underwood, Owasso, OK (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 20 days.

(21) Appl. No.: 16/891,902

(22) Filed: Jun. 3, 2020

(65) Prior Publication Data

US 2021/0384858 A1  Dec. 9, 2021

(51) Int. Cl.
*H02P 27/08* (2006.01)
*H02P 23/14* (2006.01)
*E21B 43/12* (2006.01)

(52) U.S. Cl.
CPC .......... *H02P 27/085* (2013.01); *E21B 43/128* (2013.01); *H02P 23/14* (2013.01)

(58) Field of Classification Search
CPC ....... H02P 27/085; H02P 23/14; E21B 43/128
USPC .......................... 318/811, 810, 807, 767, 727
See application file for complete search history.

(56) References Cited

U.S. PATENT DOCUMENTS

| 5,235,259 | A | 8/1993 | Dhindsa | |
|---|---|---|---|---|
| 6,005,362 | A | 12/1999 | Enjeti | |
| 7,607,896 | B2 | 10/2009 | Leuthen | |
| 8,672,641 | B2 * | 3/2014 | Yuratich | H02K 7/09 417/44.11 |
| 9,991,719 | B2 * | 6/2018 | Krolak | G05B 19/0421 |
| 10,044,306 | B2 | 8/2018 | Ademoye | |
| 10,100,835 | B2 * | 10/2018 | Torrey | H02P 6/16 |
| 10,389,287 | B2 | 8/2019 | Ademoye | |

(Continued)

FOREIGN PATENT DOCUMENTS

WO   WO 2009151680 A2   12/2009

OTHER PUBLICATIONS

International Search Report and Written Opinion for International Patent Application No. PCT/US2021/070645, dated Sep. 8, 2021, 9 pgs.

*Primary Examiner* — David Luo (74) *Attorney, Agent, or Firm* — Sprinkle IP Law Group (57) ABSTRACT

Systems and methods for reducing current imbalance in a motor, where one embodiment comprises a system having an ESP installed in a well, an electric drive, and a power cable coupled between the drive and the ESP's motor. The electric drive generates output voltage waveforms (e.g., PWM waveforms) for multiple phases that may have different impedances. The system monitors the current of each phase at the output of the electric drive and determines a current imbalance between the phases. The drive generates voltage adjustments (e.g., duty cycle adjustments) corresponding to the respective phases, and applies each voltage adjustment to the corresponding voltage waveform. For example, the drive may determine an average of the phase currents, determine the difference between each phase current and the average, and multiply the result by a gain factor to generate the voltage for each phase. The process is iteratively performed to reduce the current imbalance.

16 Claims, 6 Drawing Sheets

(56) References Cited

U.S. PATENT DOCUMENTS

| | | |
|---|---|---|
| 10,454,393 B2 * | 10/2019 | Paschedag .............. H02M 1/44 |
| 10,658,967 B2 * | 5/2020 | Shinomoto .............. H02K 5/18 |
| 2004/0257028 A1 | 12/2004 | Schulz et al. |
| 2005/0248306 A1 | 11/2005 | Chen et al. |
| 2006/0022786 A1 | 2/2006 | Layton |
| 2006/0192519 A1 | 8/2006 | Nakakita et al. |
| 2007/0128048 A1 | 6/2007 | Gonnella et al. |
| 2009/0309524 A1 | 12/2009 | Rider |
| 2010/0125384 A1 | 5/2010 | Wyatt et al. |
| 2011/0120424 A1 | 5/2011 | Fischer et al. |
| 2011/0084638 A1 | 8/2011 | Patel et al. |
| 2012/0205119 A1 | 8/2012 | Wentworth et al. |
| 2012/0319474 A1 | 12/2012 | Chung |
| 2014/0363318 A1 | 12/2014 | Wang et al. |
| 2017/0184657 A1 | 6/2017 | Neti |
| 2017/0214315 A1 | 7/2017 | Choi |

* cited by examiner

MOTOR CURRENT BALANCING METHOD FOR ESP SYSTEM

BACKGROUND

Field of the Invention

The invention relates generally to controlling motors, and more particularly to means for balancing currents of multi-phase power that is provided to a motor in a piece of downhole equipment, such as an electric submersible pump (ESP).

Related Art

In the production of oil from wells, it is often necessary to use an artificial lift system to maintain the flow of oil. Artificial lift systems may utilize various different types of pumps to lift the oil out of the well. For instance, ESP's are commonly installed in wells to pump fluids out of the wells. Typically three-phase power will be generated by an electric drive system at the surface of the well, and this power will be transmitted over a power cable that is connected to the terminals of the ESP's motor. The motor may have a rotary or linear design, and it may be permanent-magnet or induction motor.

The electric drive unit outputs three different voltage waveforms, where each voltage is applied to a corresponding one of three input terminals of the motor. The power cable connected between the drive unit and the motor has three conductors, each of which carries one of the output waveforms to a corresponding one of the motor terminals. Each of the voltage waveforms output by the electric drive unit normally has a sinusoidal voltage of the same magnitude, but where each waveform is 120 degrees out of phase with each of the other waveforms (i.e., it leads one of the other waveforms by 120 degrees and lags the other by 120 degrees). "Phase" may be used herein to refer to a single one of the waveforms or a single one of the conductors of the power cable.

If the power cable between the electric drive and the ESP motor were very short, the impedance of the cable would not be very significant in comparison to the impedance of the motor and would contribute little to the overall impedance seen by the electric drive unit. Commonly, however, ESPs are installed in very deep wells, so the power cables for the ESPs are very long, and their impedance is not negligible. Moreover, there may be differences between the impedance of one conductor of the cable and another conductor of the cable. These differences increase with the increasing lengths of the cables, and are more pronounced in flat cables (which are frequently used because of the limited amount of space within the well bore), due at least in particular to the non-symmetric arrangement of the conductors (i.e., the center conductor is influenced by the other two conductors, while the outside conductors are influenced primarily by the center conductor).

When the same voltage is applied by the drive unit to each of the conductors of the power cable, the impedance differences arising in the cable may cause different amounts of current to be drawn by the motor over each of the conductors (which may be referred to herein as a current imbalance). When different currents are drawn at each of the input terminals of the motor, the motor may be negatively impacted in several different ways. For instance, the different currents may cause extra heating in the motor, which can in turn cause damage to the electrical insulation in the motor, thereby damaging the motor and potentially causing it to fail. The current differences can also cause increased power losses in the cable (I2R loss), making the system less efficient. Still further, the different currents at the different terminals of the motor can cause torque ripple, which may create increased levels of vibration in the motor, potentially resulting in damage to the motor or failure of the motor.

The problem of current imbalance to an ESP motor coupled to a flat power cable is conventionally addressed by making transpositional splices in the cable to even out the impedances of the conductors. In other words, when the ESP and cable are being installed in the well, the cable is cut at intervals along its length (e.g., every couple of thousand feet), the center conductor is swapped with one of the outer conductors, and the cable is spliced back together. Thus, each phase of the completed (cut and spliced) cable includes sections using the center conductor and sections using outer conductors, so that the overall impedance for each phase is closer to the same. This solution, however, is time consuming and introduces potential failure points, and many well operators are understandably reluctant to cut an undamaged cable merely to splice it together again.

It would therefore be desirable to provide systems and methods for reducing the current imbalances between the different phases of a multi-phase system that drives a motor that may damage or decrease the efficiency of the system.

SUMMARY OF THE INVENTION

This disclosure is directed to systems and methods for reducing current imbalances of the type that are experienced in conventional ESP systems. These embodiments may reduce or eliminate the problems discussed above. Generally, these systems and methods involve techniques in which current imbalances at the output of an electric drive unit are measured, and voltage differences between the phases are generated at the output of the drive unit to compensate for the effects of the differing impedances of each phase, thereby driving down the current differences between the phases. Although the voltages applied to the power cable at the output of the drive unit will be different, the currents (and the corresponding voltages at the input terminals of the motor) will be the same, and the problems associated with current and voltage imbalances at the motor will be reduced or eliminated.

One embodiment comprises system including an ESP installed in a well, an electric drive, and a power cable coupled between the drive and the ESP's motor. The electric drive is configured to generate output voltage waveforms (e.g., PWM waveforms) corresponding to a plurality of phases. The power cable has a separate conductor for each of the plurality of phases, where each conductor electrically connects a corresponding output of the electric drive to a corresponding input terminal of the ESP motor. One or more of the conductors of the power cable may have a corresponding impedance which is different from the other conductors. The system has one or more current monitors which are coupled to the system (e.g., at the outputs of the electric drive) to determine the current on each of the phases. The electric drive is configured to receive input from the monitor and to determine a current imbalance between each of the plurality of phases. The drive then generates one or more voltage adjustments (e.g., duty cycle adjustments) corresponding to the respective phases, and applies each voltage adjustment to the corresponding voltage waveform, thereby reducing the current imbalance.

In one embodiment, the current monitors are configured to determine an RMS or average value of the current corresponding to each of the phases. The voltage adjustment corresponding to each phase is determined based on the RMS value of the corresponding current for the phase. The electric drive may be configured to determine the current imbalance by determining an average of the RMS currents of the plurality of phases and, for each of the phases, determining a difference between the corresponding RMS phase current and the average of the RMS currents. The electric drive may generate the voltage adjustment for each phase by multiplying this current difference by a gain factor. In some embodiments, the electric drive may initially generate output voltage waveforms for each of the phases that are identical (except that they are shifted by 120 degrees), and then iteratively determine the current imbalance and generate the voltage adjustment for each of the phases until the current imbalance is below a threshold magnitude.

An alternative embodiment comprises a method for reducing current imbalance in a drive system for a motor. This method includes generating output voltage waveforms (e.g., PWM waveforms) in an electric drive system corresponding to a plurality of phases, monitoring currents drawn on each phase at the outputs of the drive, determining whether the currents have a current imbalance, and in response to determining the current imbalance, generating adjustments corresponding to each of the phases which are applied to the adjust corresponding voltage waveforms to reduce the current imbalance.

The method may include determining an RMS value of the current for each phase and determining the corresponding the voltage adjustment based on the respective RMS values of the currents. Determining the current imbalance may comprise determining an average of the RMS currents for the phases and determining a difference between this average and each of the RMS phase currents. The voltage adjustment for each phase may be generated by multiplying the difference between the RMS phase current and the average by a gain factor. In some embodiments, the method may include initially generating identical output voltage waveforms for each of the phases and then iteratively determining the current imbalance and generating the voltage adjustment for each of the phases until the current imbalance is below a threshold magnitude.

Yet another embodiment comprises an electric drive system that includes a converter, an inverter, a DC bus coupled between the converter and the inverter, a controller coupled to the converter and the inverter, and a current monitor configured to monitor currents on each of the plurality of phases. The controller is configured to receive an indication of the current on each of the plurality of phases from the current monitor. The controller determines a current imbalance between each of the plurality of phases and generates voltage adjustments for each of the phases. The controller then controls the inverter to apply each voltage adjustment to the corresponding voltage waveform, thereby reducing the current imbalance.

The current monitors may be configured to determine an RMS value of the current for each phase and to determine the voltage adjustment for each phase based on the RMS values. The controller may determine the current imbalance by determining an average of the RMS currents for the phases and determining a difference in each phase between the corresponding RMS current and the average. The controller may generate the voltage adjustment for each phase by multiplying the difference between the phase current and the average current by a gain factor. In some embodiments, the controller initially controls the inverter to generate identical output voltage waveforms for each phase and then iteratively determine the current imbalance and generate the voltage adjustment for each of the phases until the current imbalance is below a threshold magnitude. The controller may generate PWM signals that are provided to the inverter for generation of output voltage waveforms, and the voltage adjustment for each output voltage waveform may comprise a duty cycle adjustment.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for minimizing current imbalances in a motor by measuring currents of the different phases at the output of a drive unit and controlling the output voltages of each phase to drive the current imbalances to zero. In these embodiments, an electric drive is coupled to an ESP motor by a power cable that may have different impedances on the different phases (conductors). Initially, the electric drive generates voltage waveforms on each phase that have the same RMS voltage or duty cycle. These voltage waveforms may be filtered or AC coupled through a step-up transformer before being applied to the conductors of the power cable, which transmits the voltage waveforms (minus losses associated with the filter, transformer and cable) to the input terminals of the motor. The motor draws an amount of current on each phase that depends on the particular voltage that is applied to the terminals, and may be different from one phase to another. The current on each phase is measured at the outputs of the drive unit, and differences between the phases are used to generate adjustments to the output voltage waveforms. In one embodiment, the current on each phase is subtracted from the average of the currents, and the result is multiplied by a common gain factor to arrive at the corresponding voltage adjustment. The output voltage waveform on each phase is adjusted by the corresponding voltage adjustment, and the currents at the outputs of the drive unit are again measured to determine the current imbalance. In one embodiment, this process is repeated until the current imbalance falls below a threshold (e.g., the difference between the phase current and the average current may be below a threshold value), at which point the resulting voltage difference may be maintained. In another embodiment, the process may be periodically repeated to account for changes in the current imbalance.

Figure 1:
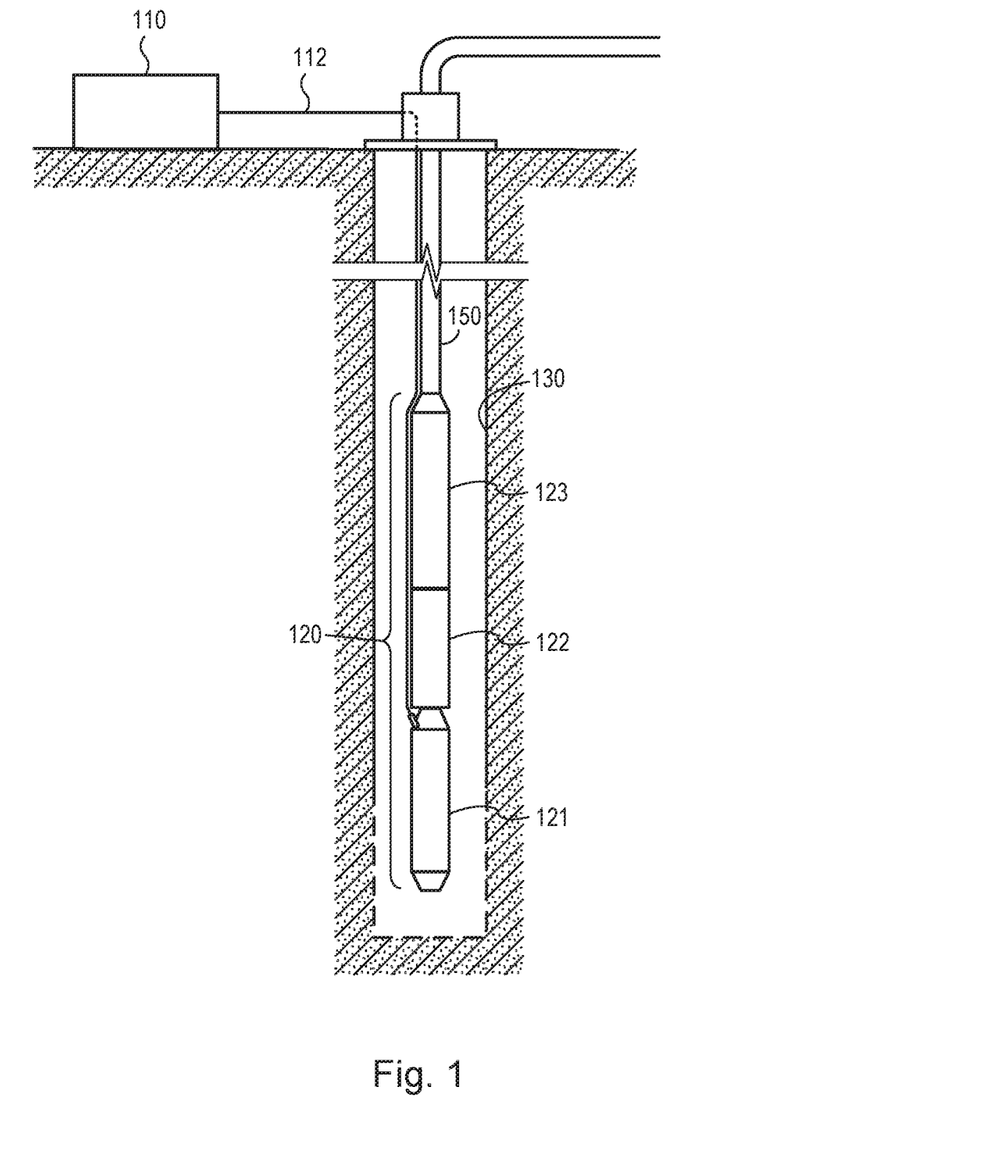
FIG. 1 is a diagram illustrating an exemplary pump system in accordance with one embodiment.

Referring to FIG. 1, a diagram illustrating an exemplary ESP system in accordance with one embodiment of the present invention is shown. A wellbore 130 is drilled into an oil-bearing geological structure and is cased. The casing within wellbore 130 is perforated in a producing region of the well to allow oil to flow from the formation into the well. ESP system 120 is positioned in the producing region of the well. ESP system 120 is coupled to production tubing 150, through which the system pumps oil out of the well. An electric drive system 110 is positioned at the surface of the well. Drive system 110 is coupled to ESP 120 by power cable 112. The system may also include various electrical data lines that may carry various types of sensed data and control information between the downhole pump system and the surface control equipment. Power cable 112 runs down the wellbore along tubing string 150. In this embodiment, power cable 112 is a flat cable that has its conductors arranged linearly to allow it to more easily fit in the annular space between the ESP/tubing the casing of the well.

ESP 120 includes an electric motor section 121, a seal section 122, and a pump section 123. ESP 120 may include a gauge package or various other components which will not be described in detail here because they are well known in the art and are not important to a discussion of the invention. Motor section 121 receives power from drive system 110 and drives pump section 123, which pumps the oil through the production tubing and out of the well. In one embodiment, motor section 121 is a rotary electric motor. In other embodiments the motor could be a linear motor. Drive system 110 receives AC (alternating current) input power from an external source such as a generator (not shown in the figure), rectifies the AC input power and then converts the DC (direct current) power to produce three-phase AC output power which is suitable to drive the motor. The output power generated by drive system 110 is provided to ESP system 120 via power cable 112.

Figure 2:
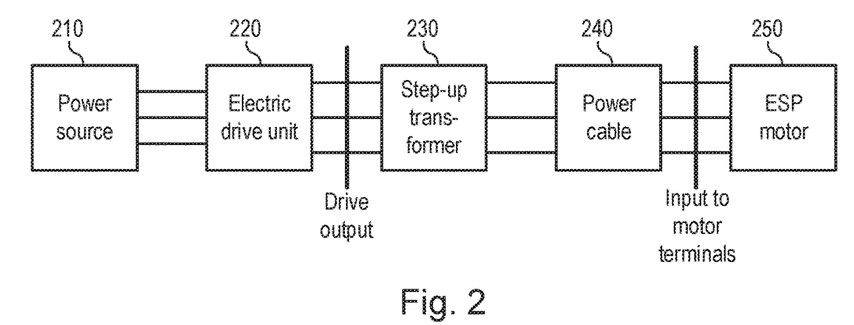
FIG. 2 is a functional block diagram illustrating the transmission of power to the ESP motor in accordance with one embodiment.

Referring to FIG. 2, a functional block diagram illustrating the transmission of power to the ESP motor is shown. As depicted in this figure, power is initially provided from a power source 210 to an electric drive unit 220. Power source 210 may comprise any suitable source of power, including AC or DC sources, power grids, generators, batteries, or the like. For example, power source 210 may be a power grid providing 480V, three-phase power. The power provided by source 210 is input to electric drive unit 220, which converts the input power to a form which is suitable to be provided to the ESP motor. In one embodiment, drive unit 220 generates a three-phase pulse width modulated (PWM) output which is low-pass filtered to produce generally sinusoidal waveforms. The waveforms generated by the drive unit 220 are provided to a step-up transformer 230, which increases the voltage of the waveforms for transmission over power cable 240. Power cable 240 conveys the voltage (minus resistive losses) to the input terminals of ESP motor 250. ESP motor 250 draws current as it operates.

Depending upon the specific voltage that is applied at each input terminal of the ESP motor and the impedance of the corresponding conductor of power cable 240, the current on each phase (of the motor and the cable) may be slightly different. As noted above, this current imbalance is undesirable because it may, for example, decrease the efficiency of the system, increase heating in the motor and the cable, cause degradation of electrical insulation in the motor, and cause additional vibration in the motor. In order to reduce the current imbalance at the input terminals of motor 250, embodiments of the present invention monitor the current of each phase and adjust the output voltage waveforms produced by drive unit 220 in order to reduce the imbalance.

Figure 3:
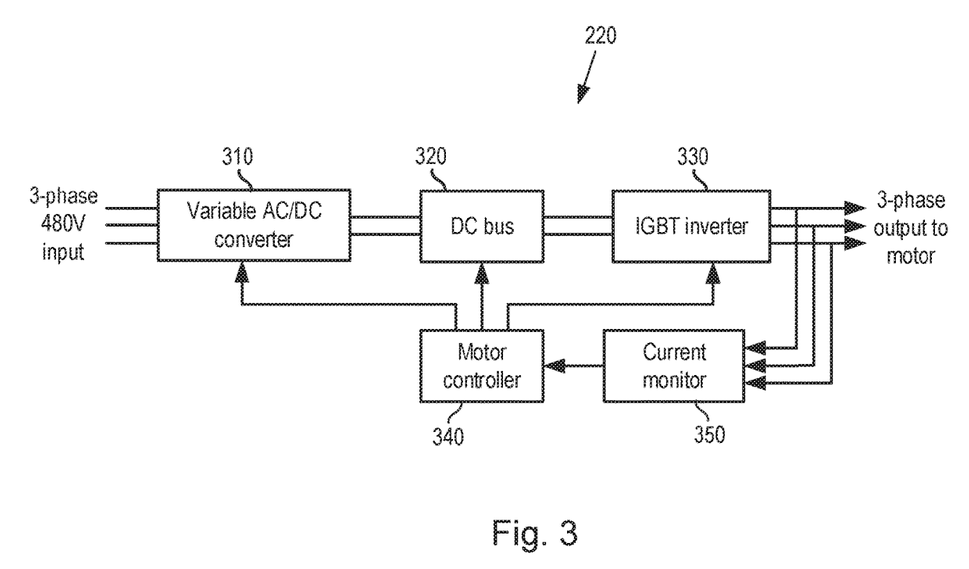
FIG. 3 is a functional block diagram illustrating the structure of a drive system for a motor in accordance with one embodiment.

In some embodiments, this functionality is implemented in a control system of the electric drive of the ESP motor. The structure of an exemplary drive system is shown in FIG. 3. As depicted in this figure, drive system 220 has a variable AC/DC converter 310 that receives AC input power from an external power source. The input power may be, for example, 480V, three-phase power. Converter 310 converts the received AC power to DC power and provides this power to a DC bus 320. The DC power on DC bus 320 is input to an inverter 330 which may use, for example IGBT switches to produce three-phase output power at a desired voltage and frequency. In one embodiment, inverter 330 is configured to generate pulse width modulated (PWM) output waveforms. Other embodiments may generate six-step output waveforms or other waveforms that can be used to drive the ESP motor. As noted above with respect to FIG. 2, the output waveforms may be stepped up by step-up transformer 230 and conveyed by power cable 240 to the input terminals of ESP motor 250.

The voltage waveforms output by inverter 330 are monitored by a current monitor 350 coupled to the output of the drive. Monitor 350 provides a signal which indicates the current drawn by the linear motor as an input to motor controller 340. Motor controller 340 may also receive various other types of information from the ESP motor and/or other equipment installed in the well. This information may be provided to an operator, and/or it may be used by motor controller 340 to control the output power that is generated by drive unit 220.

Figure 4:
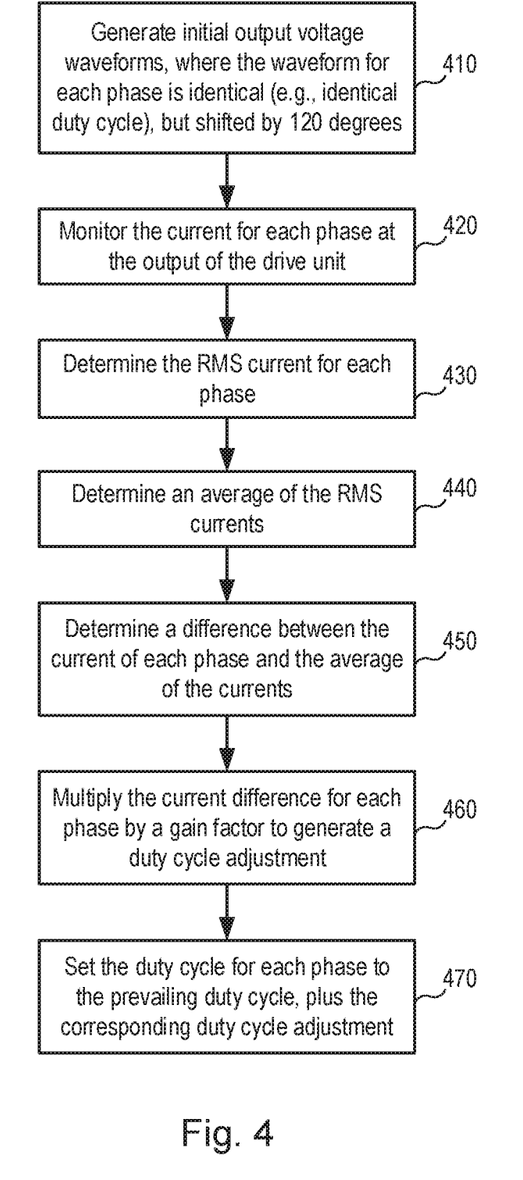
FIG. 4 is a flow diagram illustrating a method for controlling a motor to reduce current imbalance in accordance with one embodiment.

Referring to FIG. 4, a flow diagram is shown to illustrate a method for reducing current imbalances in an ESP motor in accordance with some embodiments. The method is implemented in an electric drive system which is coupled by a power cable to the motor of an ESP system installed in a well. The system may, for example use three-phase power, where for each phase, the electric drive system outputs a corresponding voltage waveform which is conveyed by a corresponding conductor of the power cable to a corresponding input terminal of the ESP motor. In this example, the voltage waveform output by the drive system is a PWM waveform.

As depicted in FIG. 4, the electric drive system initially generates output voltage waveforms which are identical except for the temporal phase shift between them (410). In this system, the generated output waveform is a PWM waveform which rapidly switches between two voltages (e.g., −10 V and +10 V). The duty cycle (the percentage of time the waveform remains at the higher voltage) varies sinusoidally. In other embodiments, the output may comprise another type of waveform, such as a six-step waveform. The waveform on each phase either lags or leads the waveforms on the other phases by 120 degrees.

The outputs of the electric drive system are applied to the conductors of the respective phases of the power cable, which conveys the corresponding waveforms to the input terminals of the motor. As noted above, the waveforms may be low-pass filtered, stepped up (using a step-up transformer) or otherwise processed before being delivered to the input terminals of the motor. When the respective voltages are applied to the input terminals of the motor, the motor runs, driving the pump of the ESP system.

When the motor is operating, the current on each phase is monitored (420). The current may be sensed and measured, for example, at the outputs of the electric drive system, or at some other point between the drive system and the ESP motor. The RMS value of the current for each phase is then determined (430). "RMS" refers to the route-mean-squared current, which is a scalar representation (essentially an average) of the time-varying current amplitude for the phase. In the case of an electric drive system that generates PWM outputs, it may be more accurate to refer to the average duty cycle of the waveform. For the purposes of this disclosure, "RMS" should be construed to include any such average or representation of the current.

The system then determines an average of the RMS currents for all of the phases (i.e., the average of the RMS current values of each phase) (440). In one embodiment, the average is computed by a controller in the electric drive system, but this functionality may be provided in a sensor/monitoring component in other embodiments. After the average of the currents of all the phases has been determined, the difference between this average and the specific RMS current of each phase is determined (450). This difference is then multiplied by a common gain factor to generate a duty cycle adjustment to the corresponding voltage waveform (460). It should be noted that the duty cycle adjustment is applicable to systems that generate PWM outputs, but other types of adjustments may be appropriate for systems that generate other types of output waveforms.

"Common" gain factor is used here to refer to the fact that the same gain factor is used to compute the duty cycle adjustment for each of the phases. The gain factor may be positive or negative, depending upon the manner in which the adjustment to the output waveform is computed. In any case, the adjustment to the output waveform for a particular phase will be positive if the corresponding current is below the average current, and will be negative if the corresponding current is above the average current, thus driving the respective currents toward the average (i.e. reducing the differences between the phase currents and the average current.

After the duty cycle adjustment has been computed, the output waveforms for each of the phases is adjusted by adding the duty cycle adjustment to the prevailing duty cycle for the corresponding phase (470). The adjustment of the output waveform propagates to the ESP motor, which then draws currents on each phase corresponding to the adjusted output voltage waveforms generated by the electric drive system. If the output waveform for a particular phase has been increased (i.e., the PWM duty cycle has increased, or the magnitude of the voltage of the waveform has increased), the current corresponding to that phase will have a corresponding increase. If the output waveform decreases, the corresponding current will also decrease.

Figure 5:
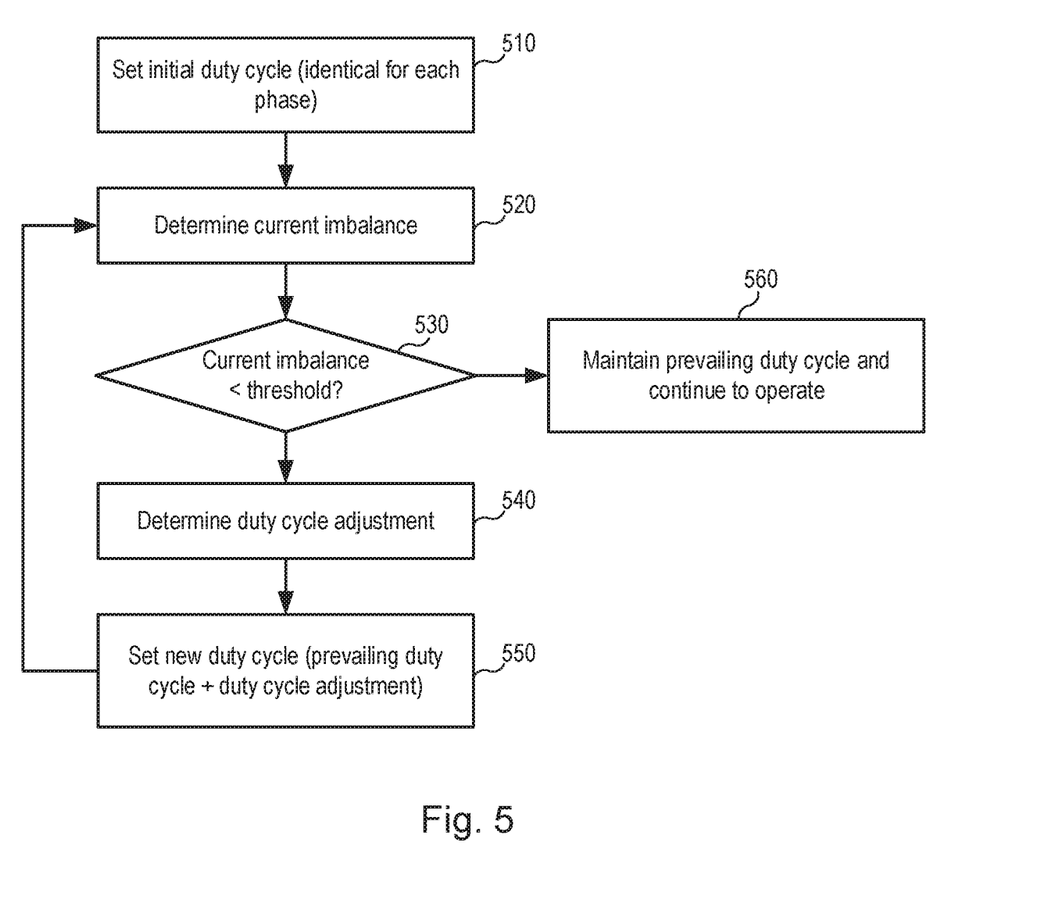
FIG. 5 is a flow diagram illustrating a method for iterative adjustment of output voltage waveforms for respective phases of an ESP system in accordance with one embodiment.

Referring to FIG. 5, a flow diagram illustrating the iterative adjustment of the output voltage waveforms for the respective phases in some embodiments is shown. As depicted in this figure, an initial duty cycle for the PWM output waveforms is initially set, with each of the initial waveforms being identical (apart from the 120 degree phase difference between them) (510). The currents of the respective phases are then measured and the current imbalance between them is determined (520). If the current imbalance is determined to be below a particular threshold (530), then there is no need to adjust to the output waveforms, and the system may simply maintain the initial duty cycles and continue to generate the same output waveforms (560). If, at 530, it is determined that the current imbalance is at or above the threshold, the system will proceed to determine the appropriate duty cycle adjustment for each of the phases (540). The duty cycle will be set (e.g., by adding the duty cycle adjustment to the prevailing duty cycle) (550), and the system will determine the current imbalance between the phases using the adjusted duty cycles (520). Again, the system will determine whether or not this imbalance (if any) is below the threshold (530). This process will be repeated until the current imbalance is below the threshold, at which point the system will maintain the prevailing (then-current) output waveforms to continue operation of the motor (560).

Figure 6:
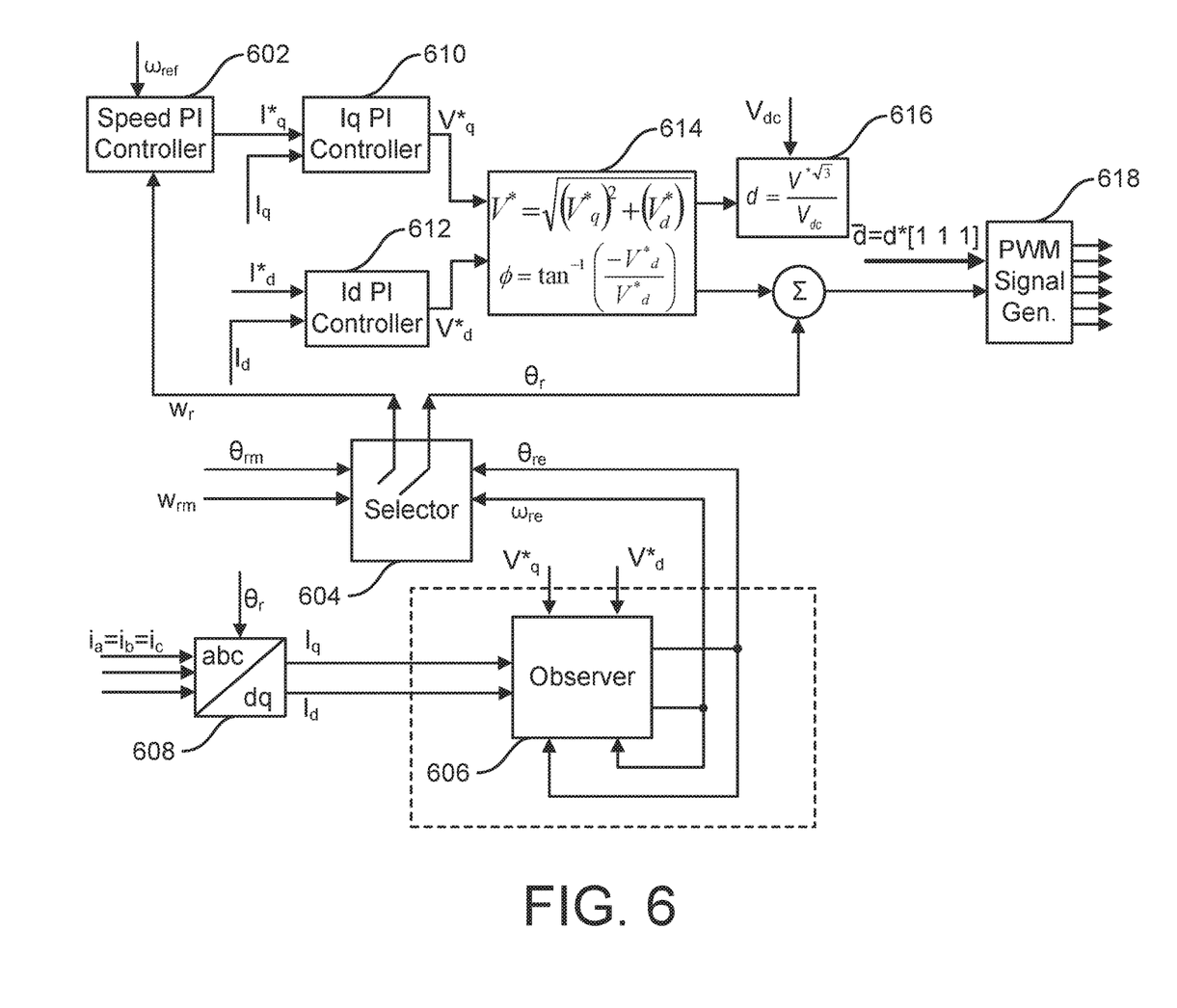
FIG. 6 is a functional block diagram illustrating the components of a field oriented control system for an electric drive unit in accordance with one embodiment.

Referring to FIG. 6, a functional block diagram illustrating the components of a field oriented control system for an electric drive unit in accordance with one embodiment is shown. In this embodiment, the controller of the electric drive implements a field oriented control algorithm, but the alternative embodiments could be implemented in other types of control systems as well.

In this embodiment, the control system uses an outer loop to control the speed of the motor and an inner loop to control the current drawn by the motor. The outer loop uses a speed proportional integral (PI) controller 602 to generate desired values for the demanded direct current ($I^*_d$) and quadrature current ($I^*_q$). These values are generated based on a reference rotor speed ($\omega_{ref}$) and an actual rotor speed ($\omega_r$). Actual rotor speed $\omega_r$ may be measured by a sensor coupled to the motor, or it may be estimated based on the current drawn by the motor. In this embodiment, a selector 604 can be used to alternately select either the measured rotor speed ($\omega_{mm}$) or the estimated rotor speed ($\omega_{re}$).

The estimated rotor speed is generated in this embodiment by an observer 606 independence on demanded quadrature voltage $V^*_q$, demanded direct voltage $V^*_d$, quadrature current $I_q$ and direct-current $I_d$. Currents $I_q$ and $I_d$ are generated by an abc-dq transformation unit 608 independence on the rotor position ($\theta_r$). Transformation unit 608 receives values of the currents measured on each of the phases in the a-b-c reference frame ($i_a$, $i_b$, $i_c$) and converts these values to currents $I_q$ and $I_d$ in the d-q reference frame using the Clark and Park techniques and provides them to observer 606.

As noted above, speed PI controller 602 receives the actual or estimated rotor speed, as well as a reference speed and generates demanded quadrature current $I^*_q$ and demanded direct current I*$_d$ these values are provided to the inner control loop, which controls the current of the electric drive. Demanded quadrature current I*$_q$ and an actual quadrature current I$_q$ are input to I$_q$ PI controller 610, which then generates a demanded quadrature voltage V*$_q$. Demanded direct current I*$_d$ and an actual direct current Id are input to I$_d$ PI controller 612, which then generates a demanded direct voltage V*$_d$. The demanded voltages generated by PI controllers 610 and 612 are in a rectangular form, so they are then input to transformation unit 614, which converts them into polar coordinates (i.e., demanded voltage V* and phase angle φ).

Demanded voltage V* is input to a modulation index computation unit 616. This unit also receives a bus voltage V$_d$c and uses this with the demanded voltage to generate a modulation index d. The modulation index is provided to a PWM signal generator 618. Phase angle φ which is generated by computation unit 616 is summed with the rotor position ($ω_r$), and the result is also provided to signal generator 618. Signal generator 618 then uses these inputs to generate a corresponding PWM signal that fires the switches of the drive's inverter (see FIG. 3) to generate the PWM output waveform.

It should be noted that the components described above are applied to each of the three phases, so that three corresponding output waveforms are generated by PWM signal generator 618. As indicated in FIG. 6, a duty cycle vector $\bar{d}$ is equal to the duty cycle d times the vector [1,1,1]. Thus, the duty cycle for each phase is d. Initially, the duty cycles for the phases are equal. If these duty cycles result in a current imbalance, duty cycle adjustments will be generated (as discussed in more detail below in connection with FIG. 7), and the duty cycles will be modified by the corresponding adjustments. If, for example, the duty cycle adjustments for the phases are [0.01, −0.01, 0], the adjusted duty cycles will be [1+0.01, 1−0.01, 1+0], or [1.01, 0.99, 1]. If a subsequently computed set of duty cycle adjustments are [0.005, −0.005, 0], the adjusted duty cycles will be [1.01+0.005, 0.99−0.005, 1+0], or [1.015, 0.985, 1].

Figure 7:
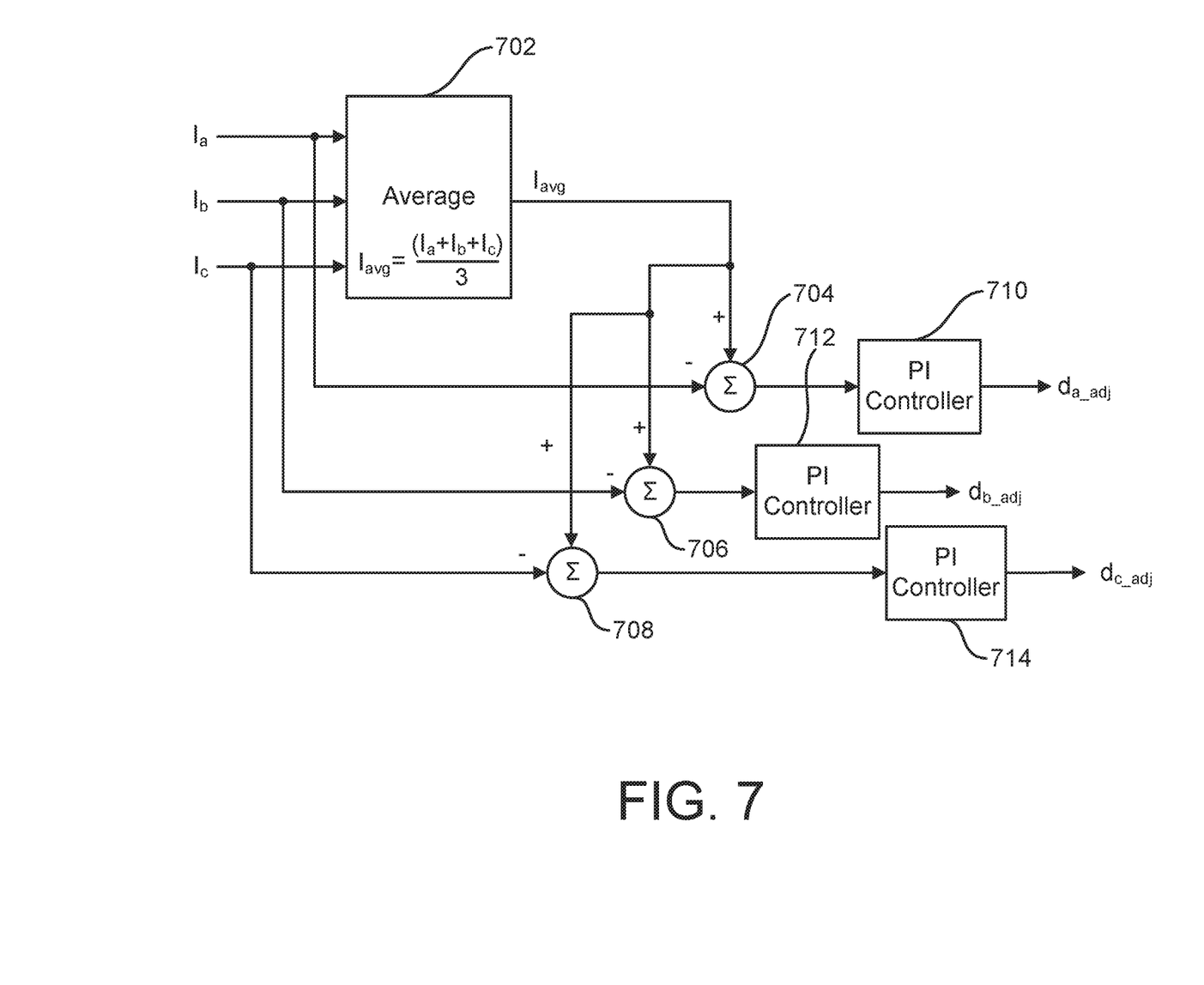
FIG. 7 is a functional block diagram illustrating the components of a control subsystem for computing duty cycle adjustments in accordance with one embodiment.

Referring to FIG. 7, a functional block diagram illustrating the components of a control subsystem for computing duty cycle adjustments in accordance with one embodiment is shown. In this embodiment, an averaging unit 702 receives the RMS currents (Ia, Ib, Ic) measured at the output of the electric drive for each of the three phases. Averaging unit 702 then computes the average of these currents and provides it to each of three summation units 704, 706, 708. Each of the summation units adds the average to the negative of a corresponding one of the RMS phase currents, and the result is provided to a corresponding one of PI controllers 710, 712 and 714. Each PI controller then generates a duty cycle adjustment (d$_{a\_adj}$, d$_{b\_adj}$, d$_{c\_adj}$) for the corresponding phase. These duty cycle adjustments are added to the prevailing duty cycle indices for the phases, and the adjusted duty cycles are input to PWM generator 618 (see FIG. 6).

As noted above the process of measuring the currents of the different phases, generating duty cycle adjustments and modifying the duty cycles of the phases according to the respective duty cycle adjustments is performed iteratively to drive measured current imbalances toward zero. The process may be continuously performed, or it may be performed until the current imbalance is driven below a threshold level and then discontinued. If the process is discontinued, it may be resumed periodically or in response to an event such as a change in controls or operating conditions to ensure that subsequently arising current imbalances are corrected.

The preceding description of the disclosed embodiments is provided to enable any person skilled in the art to make or use the present invention. Various modifications to these embodiments will be readily apparent to those skilled in the art. For instance, the functions described above in connection with the motor controller may be distributed among one or more other components of the drive system. The generic principles defined herein may therefore be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

What is claimed is:

1. A system comprising:
    an electric submersible pump (ESP) installed downhole in a well;
    an electric drive configured to generate output voltage waveforms corresponding to a plurality of phases;
    a power cable having a separate conductor for each of the plurality of phases, each conductor electrically connecting a corresponding output of the electric drive to a corresponding input terminal of a motor of the ESP; and
    one or more current monitors coupled to determine a current corresponding to each of the plurality of phases, wherein the one or more current monitors are configured to determine an RMS value of the current corresponding to each of the plurality of phases;
    wherein the electric drive is configured to
        determine a current imbalance between each of the plurality of phases, and
        generate one or more voltage adjustments, each voltage adjustment corresponding to one of the plurality of phases wherein the voltage adjustment corresponding to each phase is determined based on the RMS value of the current corresponding to the phase, wherein application of the voltage adjustment to the corresponding voltage waveform reduces the current imbalance of the corresponding phase.

2. The system of claim 1, wherein the electric drive is configured to determine the current imbalance by determining an average of the RMS currents of the plurality of phases and, for each of the phases, determining a difference between the RMS current corresponding to the phase and the average of the RMS currents.

3. The system of claim 2, wherein the electric drive is configured to generate the voltage adjustment for each phase by multiplying the difference between the RMS current corresponding to the phase and the average of the RMS currents by a gain factor.

4. The system of claim 3, wherein the electric drive is configured to initially generate output voltage waveforms for each of the plurality of phases that have an identical magnitude, and then iteratively determine the current imbalance and generate the voltage adjustment for each of the phases until the current imbalance is below a threshold magnitude.

5. The system of claim 1, wherein the one or more current monitors are configured to measure the current corresponding to each of the plurality of phases at the corresponding output of the electric drive.

6. The system of claim 1, wherein one or more of the conductors of the power cable has a corresponding impedance which is different from others of the conductors of the power cable.

7. The system of claim 1, wherein the electric drive is configured to generate pulse width modulated (PWM) output voltage waveforms, wherein the voltage adjustment for each output voltage waveform comprises a duty cycle adjustment.

8. A method for reducing current imbalance in a drive system for a motor, the method comprising:
generating, in an electric drive system, output voltage waveforms corresponding to a plurality of phases;
monitoring, at a plurality of outputs of the electric drive system, currents drawn on each of the plurality of phases;
determining an RMS value of the current corresponding to each of the plurality of phases;
determining whether the currents drawn on each of the plurality of phases have a current imbalance, and
in response to determining the current imbalance, generating one or more voltage adjustments, each voltage adjustment corresponding to one of the plurality of phases wherein the voltage adjustment corresponding to each phase is determined based on the RMS value of the current corresponding to the phase, wherein application of the voltage adjustment for each phase to the corresponding voltage waveform for the corresponding phase reduces the current imbalance.

9. The method of claim 8, wherein determining the current imbalance comprises determining an average of the RMS currents of the plurality of phases and, for each of the phases, determining a difference between the RMS current corresponding to the phase and the average of the RMS currents.

10. The method of claim 9, wherein generating the voltage adjustment for each phase comprises multiplying the difference between the RMS current corresponding to the phase and the average of the RMS currents by a gain factor.

11. The method of claim 10, further comprising initially generating output voltage waveforms for each of the plurality of phases that have an identical magnitude, and then iteratively determining the current imbalance and generating the voltage adjustment for each of the phases until the current imbalance is below a threshold magnitude.

12. The method of claim 8, wherein the electric drive is configured to generate pulse width modulated (PWM) output voltage waveforms, wherein the voltage adjustment for each output voltage waveform comprises a duty cycle adjustment.

13. An electric drive system comprising:
a converter;
an inverter;
a DC bus coupled between the converter and the inverter, wherein the DC bus receives DC power from the converter and provides the DC power to the inverter; and
a controller coupled to the converter and the inverter;
a current monitor configured to monitor currents on each of the plurality of phases;
wherein the controller is configured to:
receive an indication of the current on each of the plurality of phases from the current monitor,
determine an RMS value of the current corresponding to each of the plurality of phases,
determine a current imbalance between each of the plurality of phases, and
generate one or more voltage adjustments, each voltage adjustment corresponding to
one of the plurality of phases, wherein the voltage adjustment corresponding to each phase is determined based on the RMS value of the current corresponding to the phase,
control the inverter to apply each voltage adjustment to the corresponding voltage waveform and thereby reduce the current imbalance of the corresponding phase.

14. The electric drive system of claim 13, wherein the controller is configured to initially control the inverter to generate output voltage waveforms for each of the plurality of phases that have an identical magnitude, and then iteratively determine the current imbalance and generate the voltage adjustment for each of the phases until the current imbalance is below a threshold magnitude.

15. The electric drive system of claim 13, wherein the one or more current monitors are configured to measure the current corresponding to each of the plurality of phases at the corresponding output of the inverter.

16. The electric drive system of claim 13, wherein the controller is configured to generate pulse width modulated (PWM) signals that are provided to the inverter and cause the inverter to generate output voltage waveforms, wherein the voltage adjustment for each output voltage waveform comprises a duty cycle adjustment.

* * * * *